3,248,230
LOW SPATTERING MARGARINE
Gerardus Martinus Maria Houben, Gouda, Netherlands, and Everhardus Wilhelmus Jonker, deceased, late of Gouda, Netherlands, by Henrietta Wilhelmina Jonker, executrix, Gouda, Netherlands, assignors to N.V. Koninklijke Stearine Kaarsenfabrieken Gouda-Apollo, Gouda, Netherlands, a corporation of the Netherlands
No Drawing. Filed July 15, 1964, Ser. No. 382,968
Claims priority, application Netherlands, Aug. 21, 1959, 242,560
7 Claims. (Cl. 99—123)

The invention relates to low or substantially non-spattering margarine and to a method of reducing or eliminating margarine spattering.

The present applicaiton is a continuation-in-part application of copending U.S. application Serial No. 50,565, filed August 19, 1960, now abandoned.

Margarine spatters when fried which is an inconvenience for users and many attempts have been made to find additives for margarine to prevent spattering or which have an anti-spattering effect. The first anti-spattering additives used were lecithins or phosphatides in the form of egg yolk or vegetable phosphatides from oil seeds and more recently a synthetic lecithin. The said lecithins or phosphatides decrease margarine spattering but do not prevent it and they have an undesirable effect on the taste and keeping qualities of the margarine when used in sufficient proportions to effect a desirable reduction in spattering.

A great variety of chemical substances have been tested for their anti-spattering properties and though many of them cause a definite reduction in spattering, very few suppress spattering to a desirable extent. Serious objections have been raised against the few effective anti-spattering agents in view of the health hazards that they present. Therefore, it is common for margarines presently on the market to show marked and undesirable spattering on frying.

It is an object of the invention to provide novel low or non-spattering margarine.

It is another object of the invention to provide a novel method for effectively reducing or suppressing spattering of margarine.

These and other objects and advantages of the invention will become obvious from the following detailed description.

The novel low or non-spattering margarine compositions of the invention are comprised of margarine containing 0.12 to 0.3% of an aliphatic monoester of malic acid with a hydroxy compound selected from the group consisting of saturated fatty alcohols having 8 to 16 carbon atoms, oleyl alcohol and ethers derived from equimolar amounts of the said alcohols and a lower alkane polyol. The said margarine compositions show improved properties when used for frying and in particular have little tendency to spatter. More than 0.3% of the esters may be used, although the costs are increased by so doing.

When phosphatides are also added to the margarine lower proportions of the esters are sufficient to reduce or prevent spattering.

A preferred embodiment of the invention is comprised of margarine containing up to 0.3% of an aliphatic monoester of malic acid with a hydroxy compound selected from the group consisting of saturated fatty alcohols having 8 to 16 carbon atoms, oleyl alcohol and ethers derived from equimolar amounts of the said alcohols and a lower alkane polyol and 0.01 to 0.08%, preferably 0.02 to 0.06% of phosphatides, the amount of the said monoester being greater than the amount of said phosphatides, which margarine is low spattering or substantially non-spattering due to the strong synergistic effect of the two additives. More than 0.08% phosphatides are not added because of their undesirable effect on the taste and keep-ability of margarine. Mono-lauryl malate is especially suitable.

The phosphatides used may be of animal, vegetable or synthetic origin and may be in a purified state if desired by lecithin separated from crude extracted oils such as soybean, groundnut, maize and rapeseed oils, and dried are suitable. A preferred lecithin is soyalecithin containing about 60% phosphatides and about 40% oil. The percentages of phosphatide added to margarine according to the specification and claims relate to phosphatides having about 60% phosphatide content.

Examples of the said aliphatic mono esters of malic acid are mono-lauryl malate, mono-octyl malate, mono-oleyl malate, mixed mono-alkyl malates wherein the fatty alcohols have ben prepared from natural mixtures such as coconut oil and palm kernal oil, mono-lauryl glyceryl malate, etc. The said malate esters can also contain up to 50% of aliphatic mono esters of citric acid.

The aliphatic mono esters of malic acid can be prepared by reacting malic acid with the desired hydroxy compound at temperatures between 120° and 165° C. with stirring while removing the water of reaction, the molar proportions of the malic acid and the hydroxy compound being 1:1 in the final stage of the reaction. As usual in the esterification of reaction components of rather low volatility, it is advantageous to conduct the said reaction under reduced pressure and/or in a current of an inert gas to remove the water of reaction, to increase the reaction velocity and to complete the reaction.

The aliphatic mono esters of malic acid produced by this process are usually not in a pure state but are mixtures of several esters in which the esterified carboxyl group of malic acid may or may not be adjacent to the carbon atom bearing the hydroxyl group of malic acid. There may also be some diesters, free malic acid and other by-products. For instance, if one mole of n-octyl alcohol is reacted with one mole of malic acid (which according to the invention may be effected by stirring the non-homogeneous mixture and heating until the reaction mixture is substantially homogeneous), the mono esters containing one octyl alcohol radical esterified with one malic acid radical constitute the preponderant part of the reaction product but the product also contains dioctyl malate and free malic acid. For use in margarine and for many other purposes, removal of the dialkyl esters, which according to the invention have no anti-spattering effect in margarine, or of the residual free malic acid is not required.

In the esterification of malic acid with fatty alcohols having 8 to 12 carbon atoms or the mono ethers thereof, it is practical to start with one mole of hydroxy compounds per mole of malic acid and the reaction is effected at temperatures of about 120° to 165° C., preferably 120 to 130° C. The reactants are not miscible at the start but when about one mole of water of reaction has been removed from the reaction, the reaction mixture is substantially homogeneous. On cooling, a low proportion (i.e., about 3% of the reaction mixture) of a sticky by-product settles out and solidifies. This by-product is strongly acid and has only a low anti-spattering effect. It is preferably removed from the mono ester product.

Another manner of carrying out the process of preparing the partial ester products according to the invention, is to start with a mixture of an excess of the alcohol component per mole of malic acid. When the esterification under the usual conditions has proceeded sufficiently so that a homogeneous or substantially homogeneous reaction mixture has been obtained, the molecular proportion of alcohol component and acid is adjusted to 1:1 by adding more malic acid, and heating and stirring are continued under the described conditions (however, in the final stages the temperature may be increased to as high as 165° C.) until a homogeneous or substantially homogeneous reaction mixture has been obtained. Again a low proportion of a sticky by-product may remain undissolved. This residue is preferably removed after cooling and settling.

This manner of execution is recommended for the esterification of malic acid with saturated aliphatic alcohols containing more than 12 and up to 16 carbon atoms, oleyl alcohol and the partial ethers thereof. Specifically, this process of manufacturing monoester products according to the invention comprises reacting 1 mole of malic acid with 2 moles of hydroxyl compound at temperatures between 100 and 165° C. with stirring and removing water of reaction and, when the reaction mixture has become substantially homogeneous, adding another 1 mole of malic acid and continuing stirring and heating under the said conditions until the reaction mixture has become substantially homogeneous.

The aliphatic mono esters of malic acid may be isolated from the reaction mixture in purified form with the aid of solvents such as ethers, ethanol, petroleum ether, etc. because of the difference in the solubilities of diesters, mono esters and unreacted malic acid as shown in Example I.

It may be of advantage to use mixtures of several fatty alcohols, because mixtures of fatty alcohols are easily available and because esterification of malic acid with alcohols containing more than 12 carbon atoms is favored by the simultaneous esterification of lauryl alcohol and lower alcohols, as described in Example II.

Likewise, the esterification of lauryl alcohol with citric acid with preponderant formation of mono-lauryl citrate is favored by simultaneous esterification of lauryl alcohol with malic acid as in Example VI. The resulting mixture is very effective as an anti-spattering additive.

The margarine of the invention may be made by any of the usual processes and the aliphatic mono esters of malic acid and preferably the phosphatides may be added to the raw materials used to make margarine or to the margarine at any stage where good distribution is obtained.

Some of the malic acid esters, such as mono-lauryl malate, in margarine show other desirable properties on frying, particularly with lecithin. They cause the surface of the molten margarine to be partially covered by a fine stable foam. If the margarine contains ingredients that can form a brown sediment on frying, some of the esters favor the formation of a finely divided, loose sediment and prevent the separation of coarse dark particles or skins that tend to stick to the pan. The margarine can also contain other usual additives such as glycerol monostearate as an anti-weeping agent.

The aliphatic mono-esters of malic acid are also useful additives to cooking fats that contain no water to prevent spattering in frying moisture containing foods and generally under conditions where evaporating water causes spattering or excess foaming.

In the following examples there are described several preferred embodiment to illustrate the invention. However, it should be understood that the invention is not intended to be limited to the specific embodiments.

*Example I*

Mono-lauryl malate was prepared by heating 100 gm. of n-lauryl alcohol (0.54 mole) and 72 gm. of malic acid (0.54 mole) at 130° C. with stirring, directing a current of nitrogen through the reaction mixture until after about 1.5 hours the mixture had become homogeneous (although a slight cloudiness remained). After heating another hour under a pressure of 40 mm. Hg, the loss in weight was 9 gm. (0.5 mole) caused by the escape of reaction water. The reaction mixture at room temperature was a viscous liquid. The product was dissolved in ethyl ether and washed with water to remove 7 gm. of free malic acid. After removing the ether, the acid value was 132 (calculated for pure mono-lauryl malate 186, from which a content of 72% mono ester follows) and the hydroxyl value was 161 (calculated 186). The product was crystallized at —5° C. from a 4-fold quantity of petroleum ether (B.P. 60–80° C.). After filtering and drying the acid value was 177 (corresponding to 95% purity), the melting point was 35° C. and $n_D^{40}=1.4542$. Yield 70% of theory.

The anti-spattering effect in margarine was determined by incorporating the said crude reaction product, and the phosphatide, if any, into margarine containing no other phosphatide or anti-spattering agent. The spattering loss on frying was determined by weighing a sheet of paper held in a position to catch all spatters leaving a pan in which 80 gm. of test margarine is heated under standardized conditions over an open burner.

|  | Spattering loss mg. |
|---|---|
| (1) Margarine without additions | 40,000 |
| (2) Margarine with 0.12% ester | 5,000 |
| (3) Margarine with 0.12% ester and 0.04% soya lecithin | 30 |
| (4) Margarine with no ester and 0.04% soya lecithin | 2,500 |
| (5) Margarine with no ester and 0.12% soya lecithin | 475 |
| (6) Margarine with no ester and 0.30% soya lecithin | 200 |

(The spattering loss with 0.12% crude mono-lauryl malate product without lecithin in the series is exceedingly high; in a different series a spattering loss of 150 mg. was found with 0.12% crude mono-lauryl malate product without lecithin.)

The brown sediment formed in the margarine on frying remained finely divided in tests 2 and 3, especially in test 3.

*Example II*

100 gm. (0.52 mole according to the mean molecular weight) of the mixed alcohols obtained from the mixed fatty acids containing 6 to 18 carbon atoms of coconut oil (containing 48% lauryl alcohol) were heated with 70 gm. of malic acid (0.52 mole) at 130° C. while stirring under a current of nitrogen being directed through the mixture. After 2 hours, the reaction mixture was substantially homogeneous. The mixture was held 8 hours at 130° C. under a pressure of 140 mm. Hg. After cooling the viscous liquid reaction product consisting mainly of mixed mono alkyl malates was submitted to the above mentioned test in margarine.

|  | Spattering loss, mg. |
|---|---|
| Margarine with 0.12% mixed esters | 4,800 |
| Margarine with 0.12% mixed esters and 0.04% soya lecithin | 20 |

The brown sediment formed on frying remained very finely divided, especially in the combination with lecithin.

*Example III*

65 gm. of n-octanol and 67 gm. of malic acid (equimolar proportions) were heated under stirring at 130° C. with a current of nitrogen bubbling through the reaction mixture. After 3 hours, the mixture had become substantially homogeneous. After 7 hours, the product was cooled and was found to be a rather viscous liquid. It consisted mainly of mono-octyl malate.

In the above mentioned anti-spattering test the following figures were obtained.

|  | Spattering loss, mg. |
|---|---|
| With 0.12% crude ester | 3,000 |
| With 0.12% crude ester and 0.4% soya lecithin | 10 |

The brown sediment formed in the margarine on frying in the presence of the ester and lecithin was fairly well divided.

Example IV

A mixture of 134 gm. of (0.5 mole) of oleyl alcohol, 33.5 gm. of (0.25 mole) malic acid and 0.4 gm. of sodium stearate was stirred at 130° C., a current of nitrogen being directed through the liquid, until after 3 hours the mixture has become homogeneous. Subsequently, another quantity of 33.5 gm. of malic acid was added in portions, the pressure being reduced to 110 mm. Hg afer each addition. Only a small lower layer remained undissolved which on cooling solidified. The main product consisting mainly of mono oleyl malate was a viscous liquid. The small quantity of sodium stearate was added as a catalyst since in a previous test it had been found that the second 33.5 gm. of malic acid reacted very incompletely when no catalyst had been adde.

Anti-spattering test in margarine as mentioned above:

Spattering loss, mg.
With 0.12% of the main ester product _____ 4,500
With 0.12% of the ester product and 0.04% soya lecithin _____ 40

Example V

The glycerol ether of lauryl alcohol

$(C_{12}H_{25}O.CH_2.CHOH.CH_2OH)$ was prepared from monochlorohydrin analogous to the general method of preparing ethers from alkali metal alcoholates and halogeno compounds. The ether had a melting point of 30° C. and $n_D^{32}=1.4532$.

5.2 gm. of malic acid (0.038 mole) were added in 0.5 hour to 10 gm. of the ether (0.038 mole) that was being stirred at 120° C. and a current of nitrogen was bubbling through. After further heating at 120° C. under reduced pressure during 0.75 hour the reaction mixture had become homogeneous. It consisted mainly of mono-lauryl glyceryl malate and melted at 42–49° C. The above mentioned anti-spattering test in margarine in which 0.12% of this ester product and 0.04% soya lecithin had been showed a spattering loss of 40 mg. The sediment formed in the margarine on frying was well divided and the foam formed was satisfactory.

Example VI 93 gm. of lauryl alcohol (0.5 mole) were kept at 130° C. under stirring, while directing a current of nitrogen through the liquid and a mixture of 48 gm. of (0.25 mole) citric acid and 33.5 gm. of (0.25 mole) malic acid was added. The mixture was further heated 1.5 hours at 130°–140° C. and finally 1 hour at 150° under 40 mm. Hg. The reaction mixture was now homogeneous. It consisted mainly of mono-lauryl citrate and mono-lauryl malate and was a good anti-spattering agent, especially if combined with a low percentage of lecithin. The esterification of lauryl alcohol with citric acid in equimolecular proportions when no malic acid is present requires the procedure of Example IV that is to say a first step of 1 mole lauryl alcohol and 0.5 mole citric acid until the mixture is homogeneous, followed by a second step with another 0.5 mole citric acid. The simultaneous esterification of malic and citric acids is smoother and the product is useful for the same purposes.

Various modifications of the method and compositions of the invention may be made without departing from the spirit or scope thereof and it is to be understood that the invention is intended to be limited only as defined in the appended claims.

We claim:

1. Low spattering margarine compositions comprised of margarine containing up to 0.3% of an aliphatic mono ester of malic acid with a hydroxy compound selected from the group consisting of saturated fatty alcohols having 8 to 16 carbon atoms, oleyl alcohol and ethers derived from equimolar amounts of the said alcohols and glycerol and 0.01 to 0.08% of a phosphatide, the amount of the mono ester being greater than the amount of said phosphatide.

2. The composition of claim 1 wherein the amount of phosphatide is 0.02 to 0.06%.

3. Low spattering margarine compositions comprised of margarine containing up to 0.3% of mono-lauryl malate and 0.01 to 0.08% of a phosphatide, the amount of the said mono ester being greater than the amount of said phosphatide.

4. Low spattering margarine compositions comprised of up to 0.3% of mono-octyl malate and 0.01 to 0.08% of a phosphatide, the amount of the said mono ester being greater than the amount of said phosphatide.

5. Low spattering margarine compositions comprised of up to 0.3% of mono-oleyl malate and 0.01 to 0.08% of a phosphatide, the amount of the said mono ester being greater than the amount of said phosphatide.

6. Low spattering margarine compositions comprised of up to 0.3% of mono-glyceryl lauryl malate and 0.01 to 0.08% of a phosphatide, the amount of the said mono ester being greater than the amount of said phosphatide.

7. Low spattering margarine compositions comprised of margarine containing up to 0.3% of an aliphatic mono ester of maleic acid containing up to 50% citric acid with a hydroxy compound selected from the group consisting of saturated fatty alcohols having 8 to 16 carbon atoms, oleyl alcohol and ethers derived from equimolar amounts of the said alcohols and glycerol and 0.01 to 0.08% of a phosphatide, the amount of the said mono ester being greater than the amount of said phosphatide.

References Cited by the Examiner

UNITED STATES PATENTS

| | | | |
|---|---|---|---|
| 1,805,458 | 5/1931 | Rogers | 99—163 X |
| 1,917,256 | 7/1933 | Harris | 99—123 |
| 2,122,716 | 7/1938 | Graves. | |
| 3,006,772 | 10/1961 | Houben et al. | 99—123 |

A. LOUIS MONACELL, *Primary Examiner.*

M. W. GREENSTEIN, *Assistant Examiner.*